Dec. 24, 1946. O. V. TEEGARDEN 2,413,010
TIRE HANDLING STAND
Filed June 29, 1943 3 Sheets-Sheet 2
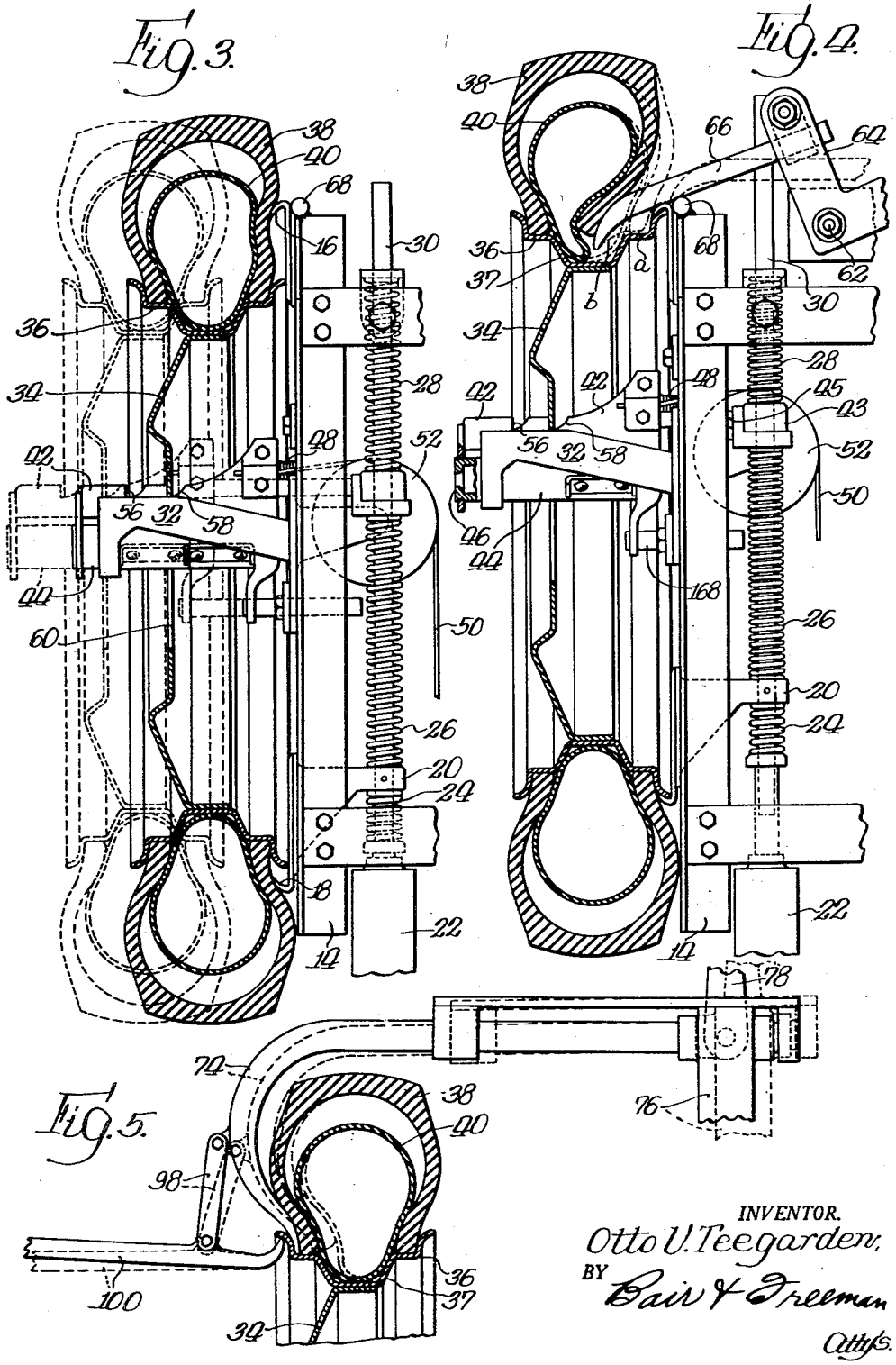
INVENTOR.
Otto V. Teegarden,
BY Bair & Freeman
Attys.

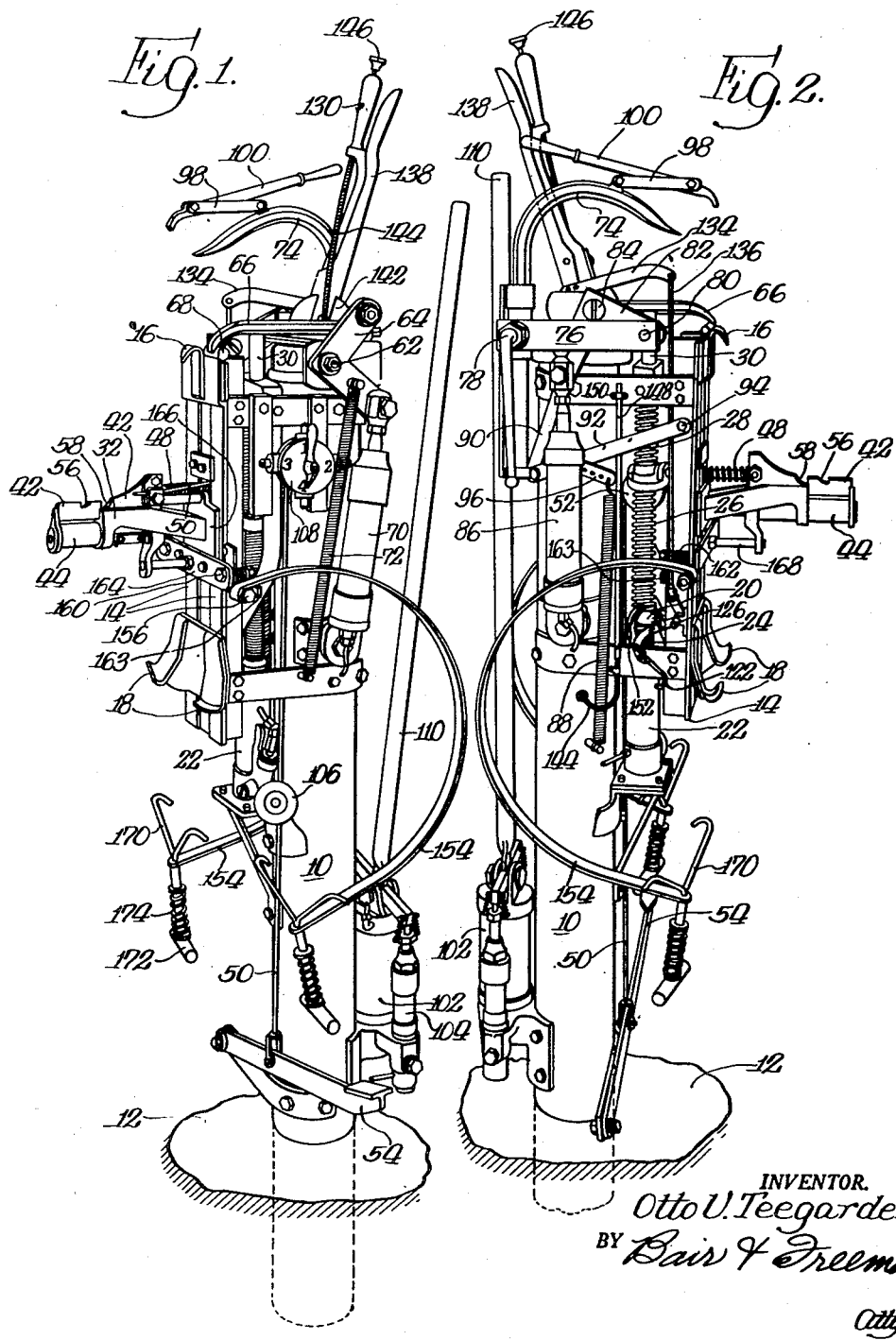

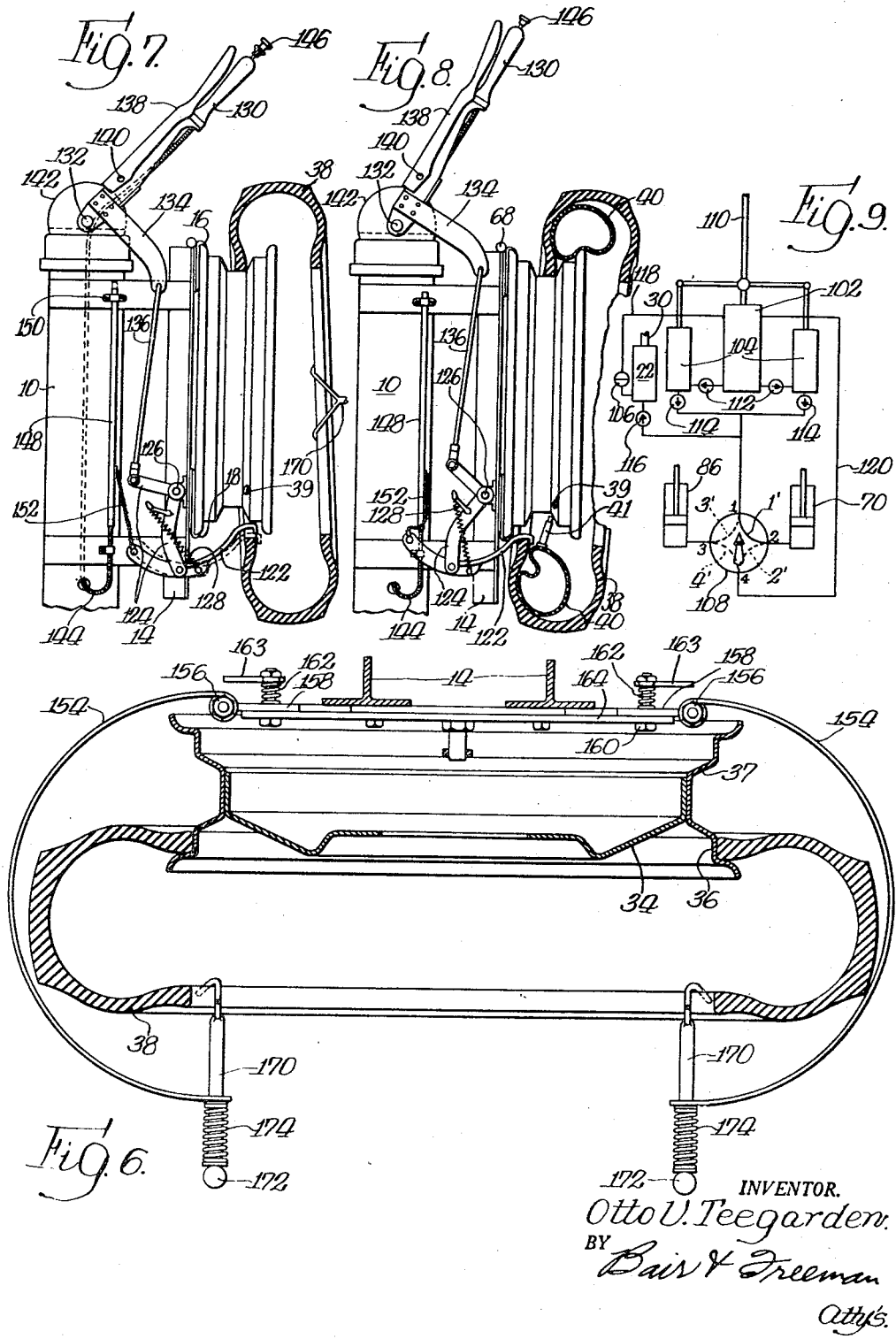

Patented Dec. 24, 1946

2,413,010

UNITED STATES PATENT OFFICE 2,413,010

TIRE HANDLING STAND

Otto V. Teegarden, Goshen, Ind.

Application June 29, 1943, Serial No. 492,684

9 Claims. (Cl. 144—288)

This invention relates to a tire handling stand on which a wheel and tire may be rigidly supported for the purpose of easily removing the tire from the wheel and replacing it thereon with a minimum of time and effort.

One object of the invention is to provide a supporting stand, which will support the wheel and tire rigidly in a non-movable position, so that it can be operated upon without slippage or other accidents occurring as when an attempt is made to change a tire lying on the ground or manually held in some other position.

Another object is to provide a support for the wheel which is automatically self-centering as certain mechanism of the stand is operated to clamp the rim of the wheel.

Still another object is to provide bead engaging bars supported by the tire handling stand and operable to readily and quickly break the tire loose from the rim, this being particularly desirable because of the tendency of a tire casing to become vulcanized to the rim after being on the rim for a relatively short period of time.

Still another object is to provide hydraulic mechanism for operating the bead loosening and rim clamping elements, so that a positive action can be secured thereon with plenty of leverage for clamping the rim in supported position and loosening the casing bead no matter how tightly it is stuck to the rim.

A further object is to provide casing spreader elements supported on the tire handling stand and readily movable to and from an inoperative position out of the way and likewise to and from an operative position where the casing can be spread considerably to facilitate inspection and repair while the casing remains partially on the rim.

Still a further object is to provide an auxiliary holding mechanism mounted on the tire handling stand and cooperable with the casing to position it where the valve of the inner tube of the tire can be readily re-inserted when replacing the tire on the rim.

Finally, it is an object of my present invention to provide a tire handling stand particularly adapted for use in connection with the present day drop center rim and designed to handle all operations in connection with the removal and replacement of a tire relative to the rim in conjunction with a tire bead tool of the kind shown in my co-pending application, Serial No. 503,174 filed September 21, 1943, issued June 26, 1945, as Patent No. 2,378,955.

With these and other objects in view, my invention consists in the construction, arrangement and combination of the various parts of my tire handling stand, whereby the objects contemplated are attained, as hereinafter more fully pointed out, set forth in my claims, and illustrated in the accompanying drawings, in which:

Figure 1 is a perspective view of one side of my tire handling stand, this being the side on which the operator stands for manipulating the stand.

Figure 2 is a perspective view of substantially the opposite side thereof.

Figure 3 is an enlarged side elevation, showing a wheel and tire being placed on the stand.

Figure 4 is a similar side elevation showing the rim of the wheel clamped in position and the inner bead of the casing being removed from the rim.

Figure 5 is a partial view somewhat similar to Figures 3 and 4, showing the outer bead being removed from the rim.

Figure 6 is a horizontal, sectional view through a portion of the stand and the wheel and tire, illustrating a casing spread operation performed with my stand.

Figure 7 is a side elevation similar to Figure 3 but on the reverse side and the parts being shown on a reduced scale, this figure illustrating the operation of an auxiliary holding means for the tire casing.

Figure 8 is a similar view showing a different position of the parts; and

Figure 9 is a diagrammatic view of the hydraulic system of my tire handling stand to illustrate the operation thereof.

On the accompanying drawings, I have used the reference numeral 10 to indicate a supporting post, which in order to be absolutely rigid is preferably embedded in a floor 12 of a garage or service station. This, of course, can be accomplished by cutting a hole through the floor and embedding the lower end of the post in concrete. Obviously a large heavy base could be used instead of embedding the post in the floor.

The post 10 has supported thereon a vertical guideway 14 formed of two T-bars. An upper rim clamping element or hook 16 is stationarily mounted thereon, and a pair of lower rim engaging elements or hooks 18 are vertically movable with relation thereto. Extending rearwardly from the rim clamping elements 18 is a bracket 20 adapted to be raised by a hydraulic jack 22. A spring 24 is interposed between the head of the jack and the bracket 20 and for return purposes a pair of springs 26 and 28 are provided. The springs 26 and 28 surround a vertically slidable rod 30 secured at its lower end to the bracket 20.

A center post 32 for a wheel 34 is provided, the rim of the wheel being shown at 36, and the tire casing and tube at 38 and 40 respectively. The center post 32 has a slidable flange 42 connected with a tube 44, which telescopes into the post, the outer end of this tube being provided with an inturned flange 46 (see Figure 4) for cooperation with the tire bead tool of my co-pending application hereinbefore mentioned.

The flange 42 is normally urged outwardly by a spring 48 and may be pulled inwardly against the bias of the spring by a cable 50. The cable 50 extends over a pulley 52 and down to a foot pedal 54. The flange has a pair of notches 56 and 58 therein for engaging the center hole 60 of the wheel 34 as shown in Figure 3.

Pivoted at 62 to the top of the post 10 is a bell crank 64 to which is pivoted an inner bead engaging bar 66. A rest or stop 68 is provided for the bar to normally rest against. The bell crank 64 is adapted to be operated by a hydraulic unit 70, comprising the usual piston and cylinder arrangement and a return spring 72 is provided therefor.

An outer bead engaging bar 74 is provided and it is hooked-shaped, so that it can extend over the top of the tire as in Figure 5. It is slidable relative to a lever 76 for adjustment to different sizes of tires, and a set screw 78 having a long handle is provided for holding the adjustment. The lever 76 is pivoted at 80 to a second bell crank 82, the bell crank 82 being pivoted to the head of the post 10 at 84.

A second hydraulic unit 86 is provided for operating the bell crank 82 and the return spring for this unit is shown at 88. It is connected to the end of the bell crank that is pivoted to the unit 86 by a link 90, a lever 92 pivoted to the guideway 14 at 94 and a lever 96 connected to the lever 92.

A pair of links 98 are pivoted to the bead engaging hook 74 and pivotally mounted on them is a lever 100 adapted for use as shown in Figure 5, which will be hereinafter more fully explained.

For operating the jack 22 and the hydraulic units 70 and 86, I provide a pump comprising an oil reservoir 102, a pair of pump cylinder and piston units 104 and control valves 106 and 108. The pistons of the pumps 104 are reciprocated by a hand lever 110 and the pumps are provided with the usual intake and outlet valves 112 and 114 shown diagrammatically in Figure 9. In this figure, the piping (omitted from Figures 1 and 2) is also shown from the outlet valves 114 to the control valve 108 and to the jack 22 through a check valve 116. The control valve 106 is mounted in a return line 118 from the jack 22 and a return line 120 is provided from the control valve 108 back to the reservoir 102.

In connection with my tire handling stand, I provide an auxiliary holding means for the tire casing, consisting of a bead engaging hook 122, pivotally carried by a bell crank 124. The bell crank 124 in turn is pivoted to the guideway 14 at 126 and a spring 128 tends to swing the hook 122 in one direction.

A hand lever 130 is provided, pivoted to the post 10 at 132 and the hand lever has an extension 134 connected by a link 136 with the bell crank 124. The hand lever 130 may be locked in any desired position by means of a secondary lever 138 pivoted thereto at 140 and engageable with a segment 142.

For the bead engaging hook 122, I provide a Bowden control wire 144 extending from a control button 146 to a vertically slidable rod 148 (see Figure 7). This rod is guided at its upper end by a bracket 150, and adjacent its lower end is connected as by a chain 152 with the hook 122. When the button 146 is pressed inwardly it rotates the hook 122 clockwise against the action of the spring 128.

In connection with my tire handling stand, I provide casing spreader mechanism in the form of a pair of C-shaped straps 154 pivoted at 156 to brackets 158. The brackets 158 are pivoted at 160, the pivots 160 including friction springs 162. The pivots 160 are supported by a cross bar 164 which is mounted on a cross-head 166 vertically slidable on the guideways 14 and carrying the center post 32. The wheel supporting flange 42 is in turn slidable inwardly and outwardly relative to the post 32 and is provided with a guide pin 168 slidable in the cross-head 166. Rigid on the pivots 162, I mount fingers 163 to support the straps 154 in an inoperative position.

Through the outer ends of the C-shaped straps 154, I slidably mount Y hooks 170 provided with T handles 172 and having coil springs 174 for moving them in a casing spreading direction as shown in Figure 6. The C-shaped straps 154 being carried by the cross-head 166 are thereby automatically adjustable to different sizes of tires—always remaining at substantially the center from top to bottom thereof.

*Practical operation*

In the operation of my tire handling stand, after the wheel 34 and the tire 38, together with the tube 40 are removed from the automobile, the wheel is temporarily supported on the center post 32 by engaging the opening 60 with one of the notches 56 or 58. It is shown engaged in dotted position with the notch 58 in Figure 3 whereas if the central portion of the wheel projects farther toward the left, it may be engaged with the notch 56. The operator then steps on the pedal 54 for the purpose of drawing the flange 42 inwardly as to the full line position which causes the inner edge of the rim 36 to engage against the vertical surfaces of the rim clamping elements 16 and 18 as shown. The hooked parts of the rim clamping elements, it will be noted, indent the casing 38. In this position, the inner edge of the rim is in alignment with the hooks 16 and 18 for subsequent proper coaction as shown in Figure 4.

With the control valve 108 in position 4 so that operation of the pumps 104 will not operate either of the hydraulic units 70 or 86, and with the control valve 106 closed, the handle 110 may now be oscillated for pumping oil from the reservoir 102 through the check valve 116 to the jack 22. This causes the jack-head to elevate and through the spring 24 thereby elevate the bracket 20, the rod 30, and the rim engaging elements 18. At the same time, the wheel supporting flange 42 is elevated at about half the speed of the rim clamping elements 18 due to a bracket 43 connected with the flange 42 by a rod 45 carried by the bracket and the flange 42 being slidable relative to this rod. The bracket 43 is suspended between the two springs 26 and 28. Thus, regardless of the size of the rim, the wheel center is substantially centered at all times between the rim clamping elements, making it unnecessary to provide a separate adjustment to fit different sizes of rims.

The elements 18, of course, have a range of movement to take in all ordinary sizes of rims.

During subsequent operations on the stand, the check valve 116 will keep the jack 22 elevated even though pressure is changed or released in the piping from the pumps 104 to the control valve 108. The rim clamping elements 16 and 18 are held against the rim 36 under tension of the spring 24 so that slight displacements of the rim while working upon it, will not loosen it from the rim engaging elements due to oil in the jack being substantially incompressible.

The next operation to be performed is to loosen the tire casing 38 from the rim 36. The initial position of the casing is shown by dotted lines at the top of Figure 4 and the bead of the casing may be released by pushing it to the full line position by the bead engaging bar 66. This is accomplished by turning the valve 108 from position 4 to position 1, the passageway in the valve being then in the full line position shown at 1' in Figure 9.

Now when the handle 110 is oscillated, oil will be pumped from the pumps 104 into the hydraulic unit 70 for rotating the bell crank lever 64 counter-clockwise in Figure 1 against the action of the spring 72. This causes the bead engaging bar 66 to move from the dotted position of Figure 4 to the full line position, closely following the rim as indicated by the dotted line a and finally following a path b as the bead engaging end of the bar enters the drop center 37 of the rim. The path b is followed by reason of the bar 66 riding on the stop 68 instead of following the drop center, and thus I avoid pinching the tube 40. By the time the inner bead of the tire has been moved to the full line position of Figure 4, it has been broken loose from the rim sufficiently far around the periphery to permit breaking loose of the rest of the bead by hand with a minimum of effort.

The control valve 108 may be moved to position 2 for releasing the oil from the hydraulic unit 70, the valve port being in the position 2' in Figure 9. The spring 72 causes the bead engaging bar 66 to be retracted.

The outer bead may then be similarly loosened by swinging the bead engaging hook 74 from the position shown in Figure 1 to the full line position shown in Figure 5. This hook may be adjusted relative to the lever 76 to accommodate different sizes of tires. The handle 100 is manipulated to the full line position so that its outer end may be pressed down upon while the bead is being loosened by movement of the hook 74 to the dotted line position. By pressing down on the handle 100 the bead engaging end of the hook 74 will properly follow the contour of the rim 36.

The hook 74 is hydraulically operated by rotation of the bell crank 82 clockwise in Figure 2, thus pulling the hook 74 inwardly through the lever 76. The control valve 108 is in position 3 for this operation whereas it is placed in position 4 for releasing the hook 74, such release being effected by the spring 88. The control valve 108 may then be left in position 4 for the next tire to be worked upon.

After the entire casing 38 is loosened from the rim 36, the tire bead tool of my co-pending application is associated with the flange 46 in the manner shown in said application for removing the outer bead of the casing from the rim. The casing may then be spread apart for inspection by swinging the C-shaped straps 154 first on their pivots 160 and then on their pivots 156 to the position shown in Figure 6, after which the T handles 162 may be manipulated for compressing the springs 174 and engaging the Y hooks 170 with the outer bead of the tire casing. The casing is now spread apart for ready removal of the inner tube 40 and for inspection and repair if desirable or necessary.

When returning the tire to its proper position on the rim, the tire casing is first dropped to the position shown in Figure 7 with its inner bead in the drop center of the rim. The Y hooks 170 are engaged with the outer bead to spread the casing and thereby facilitate insertion of the inner tube 40. The upper part of the inner tube may now be inserted over the upper half of the rim and the lower part of the inner tube then brought around under the lower half of the rim. It is somewhat difficult, however, to insert the tire valve 41 (see Figure 8) through the tire valve opening 39 of the rim without some means to hold the tire casing in a desired position. For this purpose, I provide the parts 122 to 152 which are operated as follows:

The handle 130 is moved to the position in Figure 7 for rotating bell crank lever 124 counter-clockwise and thereby swinging the hook 122 to the full line position illustrated. The thumb button 146 may then be depressed for raising the rod 148 and thereby rotating the hook 122 clockwise on its pivot to the bell crank 124 against the action of the spring 128. While the thumb button 146 is held in and while friction tends to keep the hook 122 engaged with the tire casing bead, the lever 130 may be raised to the position of Figure 8 with one hand while the operator uses his other hand to insert the valve 41 through the opening 39.

The lever 130 and the button 146 may then be manipulated for removing the hook 122 and the tire is ready for replacing the outer bead. This is done by the tire bead tool of my co-pending application as fully described therein and the tire changing job is complete, so that the inner tube can be inflated.

The control valve 106 is then opened to permit the jack 22 to lower and the wheel and tire may be removed from the tire handling stand and replaced on the automobile.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a tire handling stand, a support, a center post extending therefrom, said center post being movable radially with respect to a supported wheel, fixed and movable rim clamping elements for engaging the rim of the wheel and thereby supporting the wheel, means for moving said movable rim clamping element radially with respect to the rim and thereby clamping the rim between it and the fixed rim clamping element, and means for simultaneously therewith moving said center post to substantially centered position with respect to said rim clamping elements as said movable rim clamping element is so moved, said last means comprising a pair of springs, one interposed between said support and said center post and the other interposed between said center post and said movable rim clamping element.

2. In a tire handling stand of the character disclosed, a support, means thereon for supporting a wheel having a drop center rim and a tire thereon, and means for removal of the tire from the wheel, said last means comprising a bead engaging element for a bead of the tire casing, means for moving said bead engaging element for loosening said bead from the rim, and means including a lever for imparting rotational and translatory motion to said bead engaging element, said lever being pivoted to said support adjacent the outer edge of the rim and having an end extending away from the axis of pivoting, said bead engaging element being pivoted to said end, and stop means engaged by the bead engaging element to prevent it from entering the drop center of the rim.

3. In a tire handling stand, a rigid support, a center post extending therefrom for supporting a wheel at its center hole, rim clamping elements for engaging the rim of the wheel and thereby rigidly supporting the wheel and a tire thereon for removal of the tire from the wheel, actuating means for relatively moving said rim clamping elements to engage them with the rim, and means for simultaneously therewith moving said center post to substantially centered position with respect to said rim clamping elements as they are relatively moved, said last means comprising a rod carried by one of said rim clamping elements and slidable relative to the other one, said center post being slidable on said rod between said rim clamping elements, and two springs on said rod, one between each rim engaging element and said center post.

4. In a tire handling stand, a support, a center post extending therefrom for supporting a wheel at its center hole, rim clamping elements for engaging the rim of the wheel and thereby rigidly supporting the wheel, said center post being movable axially and having a shoulder to engage the wheel to move the wheel to a position for alignment of the marginal edge of the rim with said rim clamping elements, means for moving said center post axially, and means for operating said rim clamping elements and for simultaneously therewith moving said center post to substantially centered position with respect thereto, said last means including springs interposed between said center post and said rim clamping elements whereby movement of said rim clamping elements relatively toward each other effects movement of said center post to a substantially centered position between them.

5. In a tire handling stand, a rigid support, rim clamping elements for engaging the rim of a wheel and thereby rigidly supporting the wheel and a tire thereon for removal of the tire from the wheel with the rim and the wheel at one side of the support, a bead engaging element for loosening the bead of the tire from the rim, said bead engaging element being mounted for positive rotational and free translatory movement, a lever to effect such movement, said lever being pivoted to said support adjacent the periphery of the rim and extending away from its axis, said bead engaging element being pivoted to the outer end of said lever and sloping inwardly toward the periphery of the rim to effect a close following of the bead engaging end thereof along the walls of the channel of the rim across its periphery as the bead of the tire casing is pushed from the rim.

6. In a tire handling stand, a rigid vertical support, fixed and movable rim clamping elements for engaging the rim of a wheel and thereby rigidly supporting it and a tire thereon for removal of the tire from the wheel, means for moving said movable rim clamping element upwardly to effect engagement of it and the fixed rim clamping element with the rim, a bell crank pivoted intermediate its ends to said support adjacent the upper portion of the wheel with one arm extending upwardly and the other horizontally, a bead engaging element pivoted to the upper end of said first arm and extending in a downwardly inclined position slidable over said fixed rim clamping element, and means engaging the second arm of said bell crank for operating said bead engaging element for loosening the bead from the rim.

7. In a tire handling stand, a rigid support, a center post extending therefrom for supporting a wheel with a tire casing thereon at the center hole of the wheel, fixed and movable rim clamping elements for engaging the rim of the wheel and thereby rigidly supporting the wheel, said center post being axially movable and having means engaging the wheel to move it to a position for said rim clamping elements when operated to receive the edge of the rim, means for manually moving said center post and engaging the tire casing with said rim clamping elements with sufficient force for them to indent the casing, actuating means for engaging said rim clamping elements with the rim edge, a bead engaging element mounted on said support adjacent said fixed rim clamping element and engageable with the tire casing, and actuating means for moving said bead engaging element relative to said support for loosening the tire bead from the rim.

8. In a tire handling stand, a rigid support, a center post extending therefrom for supporting a wheel at its center hole, fixed and movable rim clamping elements for engaging opposite sides of the rim of the wheel and thereby rigidly supporting the wheel and a tire thereon for removal of the tire from the wheel, said center post being axially movable and having means to engage the wheel to also move it to a position for said rim clamping elements when operated to receive the edge of the rim, said rim clamping elements upon axial movement of said center post forcibly engaging the side of the tire casing to insure that they will receive the rim edge when they are operated, and means for operating said rim clamping elements whereby they receive said edge of said rim.

9. In a tire handling stand, a rigid support, a center post extending therefrom for supporting a wheel with a tire casing thereon at the center hole of the wheel, rim clamping elements for engaging the rim of the wheel and thereby rigidly supporting the wheel, said center post being axially movable to a position where the marginal edge of the rim will be engaged by the rim clamping elements when they are moved radially relative to each other, means for axially moving said center post and engaging it with the wheel to thereby move the tire casing to a position and with sufficient force to cause said rim clamping elements to indent the casing, and actuating means for radially moving said rim clamping elements relative to each other for engaging them with said marginal edge of the rim.

OTTO V. TEEGARDEN.